United States Patent
Hockett et al.

(10) Patent No.: US 9,930,140 B2
(45) Date of Patent: Mar. 27, 2018

(54) TIE-BREAKING FOR HIGH AVAILABILITY CLUSTERS

(71) Applicant: International Business Machines Corporation, Armonk, NY (US)

(72) Inventors: Hugh E. Hockett, Raleigh, NC (US); Christopher M. Laffoon, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 372 days.

(21) Appl. No.: 14/854,771

(22) Filed: Sep. 15, 2015

(65) Prior Publication Data

US 2017/0078439 A1    Mar. 16, 2017

(51) Int. Cl.
*G06F 15/16* (2006.01)
*H04L 29/08* (2006.01)
*G06F 11/07* (2006.01)

(52) U.S. Cl.
CPC ........ *H04L 67/322* (2013.01); *G06F 11/0709* (2013.01); *H04L 67/325* (2013.01); *H04L 67/327* (2013.01)

(58) Field of Classification Search
CPC .................................................. G06F 11/0709
USPC ........................................................ 709/213
See application file for complete search history.

(56) References Cited

U.S. PATENT DOCUMENTS

| 8,671,218 | B2 | 3/2014 | Hisgen et al. | |
|---|---|---|---|---|
| 2001/0008019 | A1* | 7/2001 | Vert | G06F 11/1662 714/1 |
| 2004/0205148 | A1 | 10/2004 | Bae et al. | |
| 2007/0016822 | A1* | 1/2007 | Rao | G06F 9/5061 714/4.11 |
| 2007/0022314 | A1* | 1/2007 | Erasani | G06F 11/1425 714/4.1 |
| 2008/0250421 | A1* | 10/2008 | Basavaraja | G06F 11/1425 718/105 |
| 2010/0318610 | A1* | 12/2010 | Hisgen | G06F 11/0709 709/205 |
| 2012/0290691 | A1 | 11/2012 | Buendgen | |
| 2013/0227009 | A1* | 8/2013 | Padmanaban | G06F 17/30091 709/204 |

* cited by examiner

*Primary Examiner* — Hamza Algibhah
(74) *Attorney, Agent, or Firm* — Cantor Colburn LLP (57) ABSTRACT

Aspects relate to managing tie-breaking in a multi-node cluster. Methods and systems include detecting, by a first node of the multi-node cluster, that a private network connected to a second node of the multi-node cluster has failed, the first node configured to provide service to a client and access a quorum disk of the multi-node cluster. The first node then communicates with an external point and determines whether the external point is successfully communicated with. The first node determines if a time delay should be imposed, waits for any determined time delay, and attempts to reserve the quorum disk. The first node then verifies it has reserved the quorum disk and obtains operational quorum when the quorum disk is reserved by the first node.

20 Claims, 3 Drawing Sheets

TIE-BREAKING FOR HIGH AVAILABILITY CLUSTERS

BACKGROUND

The present disclosure relates generally to high availability clusters and, more specifically, to tie-breaking processes in high availability clusters.

In high availability clusters, one of the most important things to prevent is data corruption on shared storage. In such clusters, multiple nodes may able to access a single shared storage but it is not intended for multiple nodes to access the storage at the same time. If multiple nodes access the storage at the same time, data on the storage may become corrupted. Thus, tie-breaking logic is applied to prevent multiple nodes from accessing the storage at the same time.

Tie-breaking is used when a cluster of multiple nodes loses operational quorum because of loss of networking between the nodes of the cluster. For example, in a non-limiting example, tie-breaking is a process of determining which of a multiple of nodes will access a shared storage when multiple nodes attempt to access the storage at the same time. For example, tie-breaking may be needed when a constant networking heart-beating between the nodes of a cluster is lost. This may happen when one of the nodes has died or when networking has been lost between the nodes. When this occurs, the nodes may not know which node currently is accessing the storage, and thus each node could attempt to access the storage. Tie-breaking is configured in cluster management software to ensure no data corruption happens and that only one of the nodes in this "split-brain" can access the shared storage, e.g., write to the storage. The two primary ways to implement tie-breaking for even-node clusters are (i) a network tie-breaker and (ii) a quorum disk tie-break.

The network tie-break works by each node pinging or communicating with a common external node or destination point, thus allowing the node that can reach that external point to keep operational quorum and the one that cannot reach the external point to lose operational quorum. Having operational quorum is the state of a node having ability to remain active, including the ability to read and write to the shared disk. A disadvantage to this approach may arise in complex networks because it may be possible for the nodes to lose network heart-beating between themselves but the nodes are able to continue verify networking access to the external point, thus resulting in multiple nodes achieving operational quorum, which can easily lead to data corruption when shared storage is used in the cluster. However, the benefit of network tie-break is that it gives a better probability of having the node that has the best opportunity to be able to be reached by networking clients to obtain operational quorum, thus keeping availability live for the cluster.

The second type of tie-break strategy is a quorum disk tie-break. In this case, reservation commands are used against a shared storage disk during a network "split-brain" to ensure only one node, or sub-cluster, can obtain operational quorum. A disadvantage of this approach is that it becomes a race for which node will attempt to reserve the quorum disk first and thus keeping operational quorum, without taking into account which node might be more available to the client. Thus, improved tie-breaking processes are desirable to provide the best node to have access to a shared storage disk in the event of a break in network heart-beating between the nodes.

SUMMARY

According to embodiments, a method, system, and computer program product are provided for managing tie-breaking in a multi-node cluster. Methods and systems include detecting, by a first node of the multi-node cluster, that a private network connected to a second node of the multi-node cluster has failed, the first node configured to provide service to a client and access a quorum disk of the multi-node cluster. The first node then communicates with an external point and determines whether the external point is successfully communicated with. The first node determines if a time delay should be imposed, waits for any determined time delay, and attempts to reserve the quorum disk. The first node then verifies it has reserved the quorum disk and obtains operational quorum when the quorum disk is reserved by the first node.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments described herein provide systems and processes for providing tie-breaking in a multi-node, high availability cluster. For example, various embodiments provide a tie-breaking management process and system that first determines which node among a plurality of nodes is the best node for claiming quorum (e.g., performing a network tie-breaker), and then performing a quorum disk tie-breaker, such that the best node for obtaining quorum is provided.

Various embodiments provide systems and methods used in high availability cluster systems to solve a high availability multi-node cluster tie-break by first attempting to use a network tie-breaker followed by a quorum disk tie-breaker. In some example embodiments, the node that can reach an external point (e.g., network tie-break winner) immediately attempts to obtain quorum, i.e., reserve the quorum or shared disk/storage. A node that cannot reach the external point may inject a time-delay before attempting to obtain quorum. The result of this approach is that when one of the nodes has networking to the external point, and thus is more likely to have availability to a client of the system, that node will attempt to obtain quorum earlier, and thus this node will have an increased chance of winning the tie-break over nodes that do not have networking connectivity to the external point. The end result is a solution that is as safe from data corruption as a quorum disk tie-break system but retains availability of the system for end user clients in more situations by employing network tie-breaking.

Figure 1:
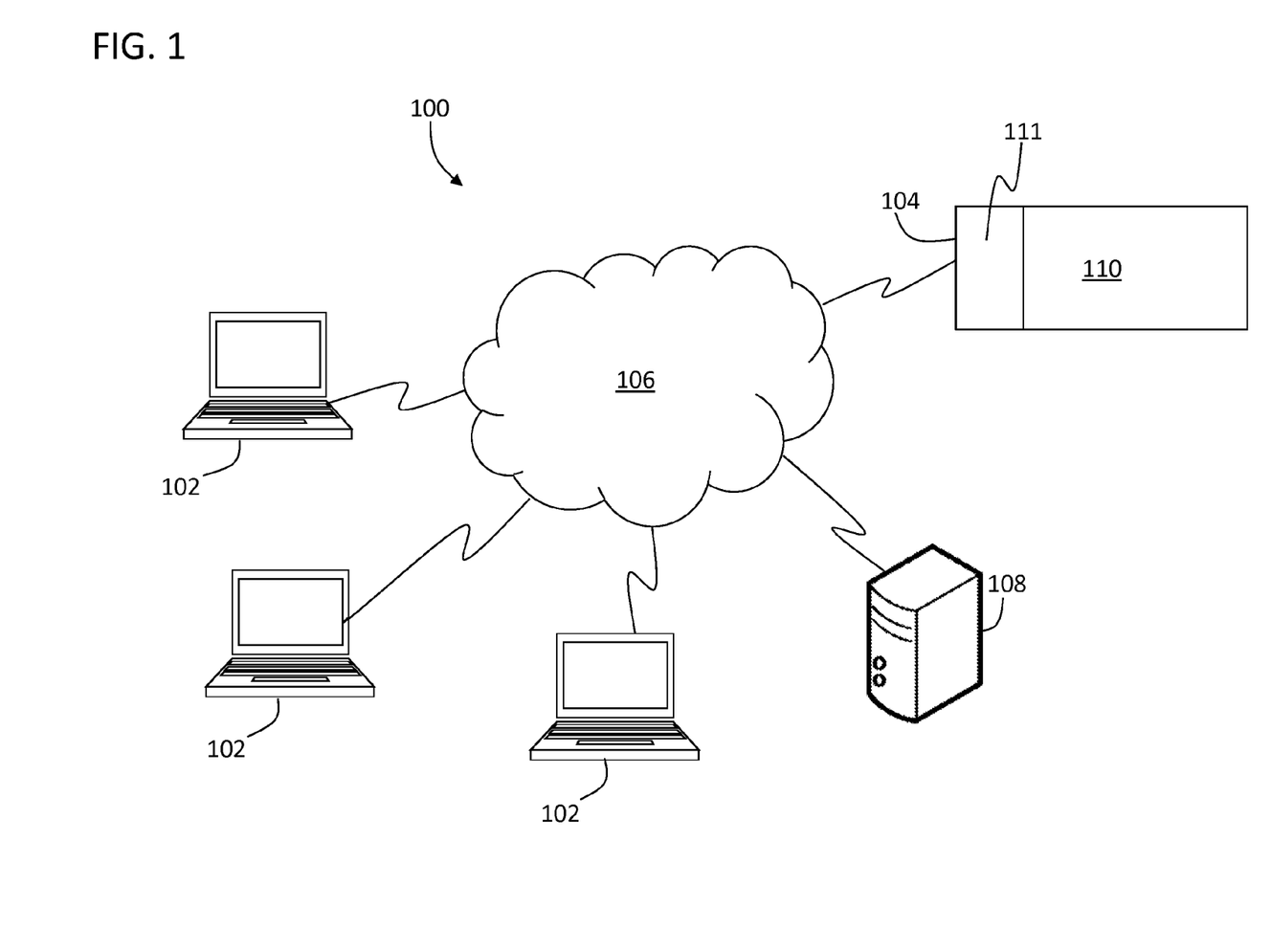
FIG. 1 depicts a block diagram of a system for enabling collaborative efforts to generate collaborative content in accordance with an embodiment.

Referring to FIG. 1, a block diagram of a system 100 that includes a high availability cluster 111 in accordance with an embodiment is shown. The system 100 includes a quorum disk 110 configured to host and provide services to a user or client. The quorum disk 110 may be hosted on a host system 104 and may be accessible by one or more user system(s) 102, e.g., clients. The quorum disk 110 may be hosted on a memory or disk that is accessible through a network 106 and a high availability cluster 111 within the host system 104 may be configured to enable access to the quorum disk 110. The cluster 111 may include two or more nodes that provide an interface between the user systems 102 and the service application 110 and may be configured to write to the quorum disk 110. In such a configuration, each node of multiple nodes within the cluster 111 may be redundant with the other nodes, such that if one node fails, another node may be present to continue to enable the user systems 102 to access the quorum disk 110.

The system 100 depicted in FIG. 1 includes one or more user systems 102 through which users, e.g., clients accessing the quorum disk 110, at one or more geographic locations may contact the host system 104 to access the quorum disk 110. The user systems 102 are coupled to the host system 104 via a network 106. Each user system 102 may be implemented using a general-purpose computer executing a computer program. The user systems 102 may be user devices such as personal computers (e.g., a laptop, a tablet computer, a cellular telephone, etc.) or host attached terminals. The user systems 102 may also include, as non-limiting examples, game consoles, network management devices, and field programmable gate arrays. In addition, multiple user systems 102 and/or host systems 104 may be concurrently operating to aggregate web interactions for personalized usage.

The network 106 may be any type of known network including, but not limited to, a wide area network (WAN), a local area network (LAN), a global network (e.g. Internet), a virtual private network (VPN), a cloud network, and an intranet. The network 106 may be implemented using a wireless network or any kind of physical network implementation known in the art. A user system 102 may be coupled to the host system through multiple networks 106 (e.g., cellular and Internet) so that not all user systems 102 are coupled to the host system 104 through the same network 106. One or more of the user systems 102 and the host system 104 may be connected to the network 106 in a wireless fashion. In one non-limiting embodiment, the network is the Internet and one or more user systems 102 execute a user interface application (e.g. a web browser) to contact the host system 104 through the network 106. In another non-limiting example embodiment, the user system 102 is connected directly (i.e., not through the network 106) to the host system 104. In a further non-limiting embodiment, the host system 104 is connected directly to or contains a storage device 108.

The storage device 108 may include data relating to the quorum disk 110. In some embodiments, the storage device 108 may be implemented using a variety of devices for storing electronic information. In an example embodiment, data stored in the storage device 108 includes, but is not limited to, one or more search data and search history databases, and other data utilized by embodiments described herein. It is understood that the storage device 108 may be implemented using memory contained in the host system 104 or that it may be a separate physical device. The storage device 108 may be logically addressable as a consolidated data source across a distributed environment that includes the network 106. Information stored in the storage device 108 may be retrieved and manipulated via the host system 104 and/or via a user system 102.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access, e.g., permitting only designated user systems 102 to access the quorum disk 110. A firewall may be implemented using conventional hardware and/or software as is known in the art.

The host system 104 may also operate as an application server. The host system 104 may host the application on the quorum disk 110. Processing may be shared by the user system 102 and the host system 104 by providing an application to the user system 102. As previously described, it is understood that separate servers may be utilized to implement the network server functions and the application server functions. Alternatively, the network server, the firewall, and the application server may be implemented by a single server executing computer programs to perform the requisite functions.

When a client or user attempts to contact the quorum disk 110 through the network 106, they may access the quorum disk 110 through the nodes of the cluster 111. Multiple nodes in the cluster 111 may provide redundancy to maintain proper and continuous service and accessibility to the quorum disk 110. However, problems may arise related to service when issues occur within the cluster 111, such as failure of one or more network connections, failure of one or more nodes, etc. Accordingly, cluster management software may be implemented on each of the nodes within the cluster 111 such that the best service may be provided in any given situation.

Figure 2:
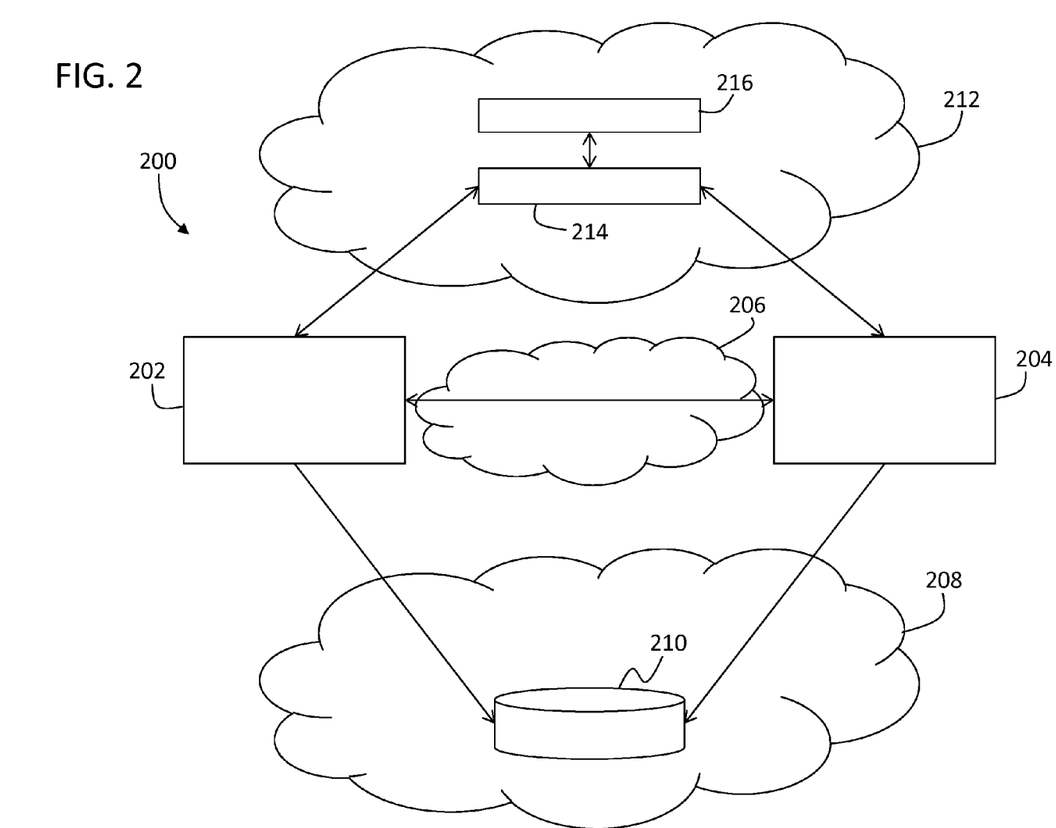
FIG. 2 depicts a schematic illustration of a multi-node cluster configured with a single private network between the nodes that may employ embodiments described herein.

Turning to FIG. 2, a schematic illustration of a system 200 having a two node cluster (first node 202 and second node 204) configured with a private network 206 between the two nodes 202, 204 is shown. The private network 206 may be configured as a secure and/or dedicated communications network between the first node 202 and the second node 204. Each of the nodes 202, 204 can communicate with the other node 202, 204, e.g., ping or exchange network messages. In some embodiments, a heartbeat may be communicated over the private network 206, wherein the heartbeat is an indication that both nodes are active/alive and assists in determining which node 202, 204 has quorum. In some embodiments, the heartbeat may be configured as a persistent and/or constant exchange of network messages between the two nodes 202, 204. The exchange may be configured on a schedule, such that in the absence of an expected message or communication, the respective node 202, 204 may determine that a problem has occurred.

Each node 202, 204 in the cluster is connected by a single storage area network 208 to a quorum disk 210. Each node 202, 204 is configured to access the quorum disk 210 and write thereto when the node 202, 204 has quorum. In some embodiments, the nodes 202, 204 may be configured to perform Small Computer System Interface-Persistent Reservation (SCSI-PR) operations with respect to the quorum disk 210 such that only one of the first node 202 and the second node 204 has quorum with the quorum disk 210. As used herein a node having quorum means the node has the ability to write to the quorum disk 210.

Further, as shown in the configuration of FIG. 2, each of the first node 202 and the second node 204 are configured to connect to a public network 212 which may include a gateway 214. The gateway 214 in the public network 212 may enable an external client 216 to access the quorum disk 210 through one of the first node 202 and the second node 204. In some embodiments, the client 216 may be the user systems 102 shown in FIG. 1.

Cluster management software is configured to be run on each of the first node 202 and the second node 204 to perform a constant heartbeat over the private network 206 between the first node 202 and the second node 204. That is, the first node 202 may communicate with the second node 204 and the second node 204 can communicate with the first node 202 over the private network 206. The communication or heartbeat between the first node 202 and the second node 204 may enable the first node 202 and the second node 204 to coordinate enabling the connection between the client 216 and the quorum disk 210 such that only one of the first node 202 and the second node 204 may provide the access to the quorum disk 210. As noted, the access provided by the first node 202 and the second node 204 is an ability to read and write from and to the quorum disk 210 in response to queries or interactions from the client 216.

In the event of a detection of link down issues on the private network 206, the cluster management software on each of the first node 202 and the second node 204 will first try to communicate with an external point, such as the gateway 214, on the public network 212. This is referred to as a network tie-break operation. As will be appreciated by those of skill in the art, other external points other than the gateway 214 may be used. If the gateway 214 can be communicated with, the cluster management software of the node will immediately attempt to reserve the quorum disk 210, i.e., attempt to obtain quorum. That is, because each of the first node 202 and the second node 204 does not know if the other of the first node 202 and the second node 204 is holding quorum, the node 202, 204 will attempt to obtain quorum such that services are uninterrupted for the client 216.

In this situation, a second step may be provided to ensure the best node of the first node 202 and the second node 204 obtains quorum. That is, a preferred node should ideally hold quorum such that services are uninterrupted for the client 216. Thus, when one of the first node 202 and the second node 204 attempts to obtain quorum, the node 202, 204 will check to see if the other node 202, 204 has already obtained quorum. Such check may be based on a reservation of the quorum disk 210 by one of the first node 202 and the second node 204. That is, if both nodes 202, 204 are able to communicate with the gateway 214 it becomes a race between the first node 202 and the second node 204 to obtain quorum.

If the gateway 214 cannot be communicated with, the node that cannot communicate with the gateway 214 will wait a period of time longer than a maximum heart-beating time before attempting to reserve the quorum disk 210. The maximum heart-beating time may be the maximum time that each of the first node 202 and the second node 204 is configured to communicate with the other of the first node 202 and the second node 204 over the private network 206. The wait time may be a self-imposed wait time that is built into the cluster management software of the particular the first node 202 and the second node 204.

As will be appreciated by those of ordinary skill in the art, the above is a general explanation of the system and various scenarios are contemplated such that services are maintained. Various example scenarios will be explained below, with reference to FIG. 2.

In a first scenario, the first node 202 is live, the second node 204 is live, the public network 212 is operational, and the private network 206 has failed. Accordingly, similar to that described above, both nodes 202, 204 are live and able to access both the quorum disk 210 and the gateway 214, but the private network 206 between the first node 202 and the second node 204 fails. In such a situation, the heart-beating will fail and each of the first node 202 and the second node 204 may be configured to attempt to obtain quorum such that services to the quorum disk 210 are uninterrupted. As such, the cluster management software on each of the first node 202 and the second node 204 will have the respective node 202, 204 attempt to communicate with the gateway 214 to ensure that the node can continue to provide services to the client 216. After determining that the respective node 202, 204 has external access, the respective node 202, 204 will communicate with the quorum disk 210 to determine if the quorum disk 210 is reserved by the other node 202, 204. If the quorum disk 210 is not reserved, the node 202, 204 will obtain quorum. However, if the node 202, 204 determines that the other node 202, 204 has quorum, based on a reservation indicator, the node 202, 204 will not attempt to obtain quorum. Thus, services to the quorum disk 210 are maintained even when the private network 206 fails.

In a second scenario, the first node 202 is live, the second node 204 is live, the public network 212 has failed, and the private network 206 has failed. In such a situation, each of the first node 202 and the second node 204 will attempt to communicate with the public network 212 and determine they cannot provide services to the client 216. Accordingly, each respective node 202, 204 will each impose a time delay before attempting to obtain quorum. After the time delay, each node 202, 204 will attempt to obtain quorum, and in this process both nodes 202, 204 will check the reservation of the quorum disk 210, and if no reservation, the respective node 202, 204 to first attempt to obtain quorum will achieve quorum and the other node 202, 204 will then see a reservation is made. In such a situation, when the public network 212 goes live again, the client 216 will be able to access the quorum disk 210 through the node 202, 204 that obtained quorum.

In a third scenario the first node 202 is live, the second node 204 is live, the public network 212 is live, the private network 206 is live, and a communication between the second node 206 and the gateway 214 fails. That is, the first node 202 can access the gateway 214 but the second node 204 cannot. In this situation, the first node 202 will communicate with the gateway 214 and then immediately attempt to obtain quorum because it determines that it can continue to provide services to the client 216. At the same time, the second node 204 determines it cannot access the gateway 214 and thus imposes a time delay prior to attempting to obtain quorum. Thus, the best node, i.e., the first node 202, will obtain quorum and the client 216 will not experience any disruption to accessing the quorum disk 210. As will be appreciated, the above applies when one of the nodes of a plurality of nodes loses the ability to communicate with the external point, and the specific example is not intended to be limiting.

In a fourth scenario, the first node 202 is live, the second node 204 is live, the public network 212 is live, the private network 206 fails, and the storage area network 208 fails.

That is, the connection between the first node 202 and the second node 204 and the quorum disk 210 has failed. In such a situation, both nodes 202, 204 will attempt to access the gateway 214 and succeed. As such, both nodes 202, 204 will then attempt to obtain quorum. However, because of the failed connection between the nodes 202, 204 and the quorum disk 210, neither node 202, 204 will be able to obtain quorum. In this situation, although the client 216 may lose access to the quorum disk 210, there may not be corruption to the quorum disk 210 by actions of the nodes 202, 204, as neither node 202, 204 will have quorum.

In a fifth scenario, the first node 202 is live, the second node 204 fails, the public network 212 is live, and the private network 206 fails. In such a situation, the second node 204 will not make any attempts to obtain quorum. However, because of the cluster management software on the first node 202, the first node 202 will attempt to access the gateway 214 and succeed. The first node 202 will then immediately attempt to obtain quorum, and will succeed. Thus, even though the second node 204 fails, service is uninterrupted for the client 216.

Although a limited number of examples and scenarios are described above, those of skill in the art will appreciate that the cluster management processes described herein may enable continuous and/or the best tie-breaking between multiple nodes in a cluster. Thus, regardless of the specific situation, cluster management processes described herein may enable the best node to obtain quorum and thus provide services to a client.

Figure 3:
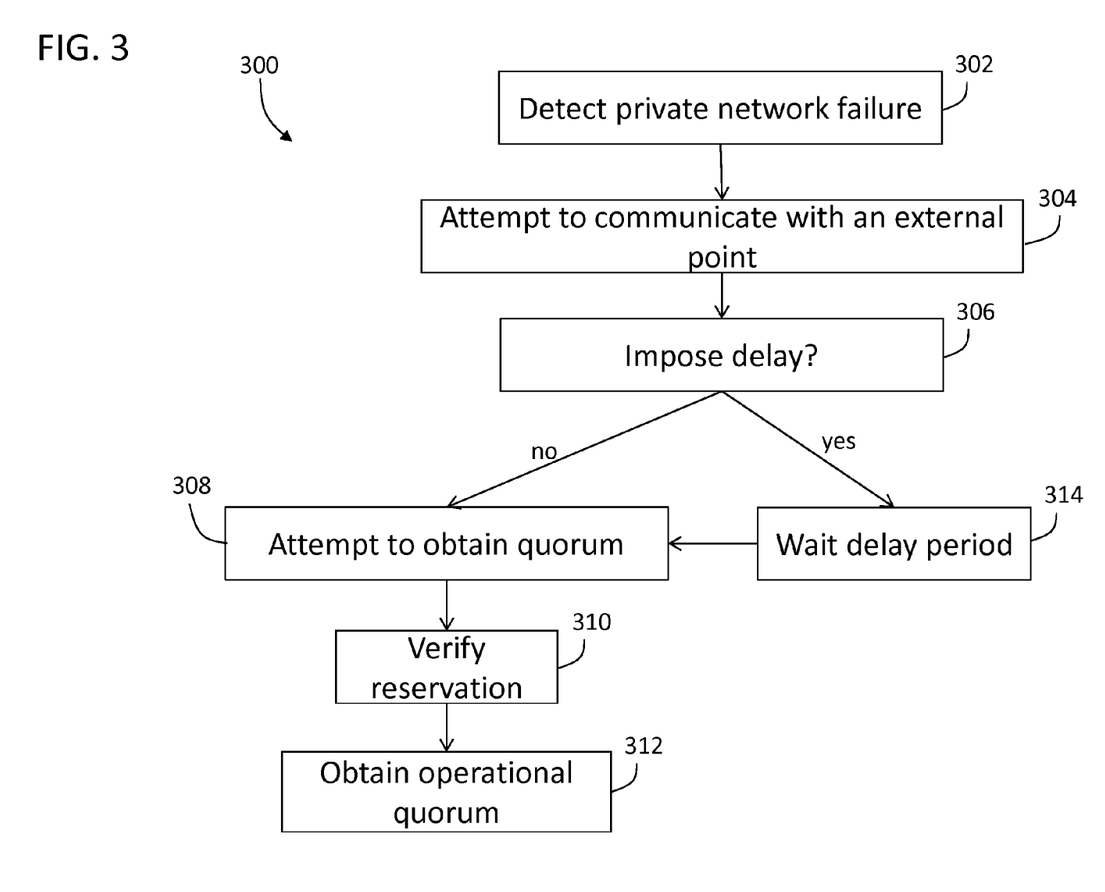
FIG. 3 depicts a block diagram of a system for managing tie-breaking in a multi-node cluster in accordance with an embodiment of the present disclosure.

Turning now to FIG. 3, a flow process 300 illustrating a method for managing tie-breaking in a multi-node cluster in accordance with an embodiment of the present disclosure is shown. The flow process 300 may be implemented as cluster management on a node, such as described above, that is part of a multi-node cluster system. Each node in a cluster may perform the flow process 300 such that the best node in a cluster may maintain or obtain quorum and thus provide the best service to an external client. Further, in some embodiments, the flow process 300 may be performed by sub-clusters in a multi-cluster having multiple sub-clusters, as well as performed by the nodes within the sub-clusters.

When a private network fails (e.g., as described above), a node may determine that the private network has failed, as shown at block 302. The determination that the private network has failed may be based on the inability to communicate with another node or receive a heartbeat communication from another node within a predetermined time period. Other mechanisms to determine that the private network has failed may be employed without departing from the scope of the present disclosure.

The node may then attempt to communicate with an external point, as shown at block 304. The communication may be made to an external point, such as a gateway or other device or point on an external or public network. Such process ensures that the node has access to the public network and thus can provide services to a client that may attempt to access a quorum disk that the node manages interactions with.

Next, the node will determine if a time delay should be imposed, as shown at block 306. For example, in some embodiments, the time delay may be based on the node's ability to communicate with the external point. That is, the time delay may be based on the a failed attempt to contact the external point at block 304. In some embodiments, alternatively or in combination with the above process, the node may impose a time delay at block 306 based on an ability (or inability) of the node to communicate with multiple external points. Further, in some embodiments, alternatively or in combination with the above processes, the node may increase the imposed time delay as the number of the external points that cannot be communicated with increases. Further, in some embodiments, alternatively or in combination with the above processes, the node may impose a time delay based on an accessibility and/or workload availability of the node, and the time delay may increase as the accessibility and/or workload availability decreases. Further, in some embodiments, alternatively or in combination with the above processes, the node may impose a time delay based on an ability of the node to provide predetermined services to a client.

If the node determines that no time delay should be imposed, the node will immediately attempt to reserve quorum, as shown at block 308. In this case, the node may check to see if the quorum disk has been reserved, and verify if the node has reserved the quorum disk, as shown at block 310. If the reservation is verified with the node, the node will obtain operational quorum, as shown at block 312. If the quorum disk is reserved, the node determined that the reservation is not with the node, the node will not obtain operational quorum.

However, if the node determines that a time delay should be imposed at block 306, the node will impose a time delay and wait for a period of time equal to the imposed time delay, as shown at block 314. After the time delay has passed, the node will proceed with the steps described with respect to blocks 308, 310, and 312. That is, after waiting the time delay at block 314, the node will attempt to obtain quorum.

As will be appreciated by those of skill in the art, the flow process may be performed by multiple nodes simultaneously. Based on the individual processes, the best node will obtain quorum and services should remain unchanged for a client, unless the quorum disk or communication to the quorum disk has failed.

Although described herein with respect to a two-node configuration, those of skill in the art will appreciate that the cluster management described herein may be applied to any number of nodes and/or may be applied within sub-clusters, and each sub-cluster may have its own cluster management such that the process may be performed at the node level and then at the sub-cluster level.

As described above, a time delay may be self-imposed by a node during the cluster management process. The time delay may be a fixed or predetermined value that is greater than the heartbeat timing between nodes. In some embodiments, the time delay may be the same for every node in a cluster. In other embodiments, the time delay for each node may be set for that particular node. For example, if two nodes in a cluster are on different time schedules, the time delays may be configured to account for the schedule of the particular node.

In some embodiments the time delay may be weighted based on various criteria. For example, the time delay may be based on the accessibility or workload ability of a node. That is, if a node has a partial failure, but is still live, during the above described process, the node may impose a longer than normal time delay. Further, the imposed time delay may be based on a percentage of accessibility, wherein the shortest time delay is when the node is at 100% accessibility and the time delay may increase as the accessibility decreases. In such embodiments, this may enable the best node to obtain quorum.

Further, in the alternative or in combination, the time delay may be based on priorities of the workloads of the nodes. That is, if a node is less than 100% accessible, but has access to a primary or important workload or function, then it may have a lesser delay than another node with the same accessibility percentage, or even a greater accessibility, but only has access to less important workloads or functions.

Further, in some embodiments, the time delay may be based on the ability of a node to communicate with multiple external points. In a non-limiting example, each node may be configured to communicate with three external points during the network tie-breaking process. If a node can only communicate with one or two of the three nodes it may impose an appropriate time delay such that it delays attempting to obtain quorum. At the same time, a node that can communicate with all three external points may not have any time delay imposed. Similarly, a node that can communicate with only one of three external points may impose a longer time delay than a node that can communicate with two of three external points. In this fashion the best capable node may obtain quorum such that services to a client may be impacted the least. Moreover, in some embodiments, the time delay may be based in part on the priority given to a particular external point, such that one external point may have a longer time delay associated with the inability to communicate with that specific external point.

Further, as will be appreciated by those of skill in the art, a post reserve delay may be imposed on some or all nodes to further ensure no issues with the cluster management processes described herein. For example, in the event that the private network fails, and the cluster management described above is performed, the node that obtains quorum may wait a predetermined period of time before performing any tasks, e.g., a post reserve delay may be imposed prior to enabling services for a client.

Technical effects and benefits include tie-breaking management such that a best node may obtain quorum and maintain services to a client in a multi-node cluster. Further technical effects include imposing a time delay during a tie-breaking process such that the best node may obtain quorum in a multi-node cluster.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer implemented method to manage tie-breaking in a multi-node cluster, the method comprising:
   detecting, by a first node of the multi-node cluster, that a private network connected to a second node of the multi-node cluster has failed, the first node configured to provide service to a client and access a quorum disk of the multi-node cluster;
   communicating, by the first node, with an external point;
   determining, by the first node, if the external point is successfully communicated with;
   determining, by the first node, whether a time delay should be imposed;
   waiting, by the first node, a period equal to the determined time delay, if any;
   attempting, by the first node, to reserve the quorum disk;
   verifying, by the first node, that the quorum disk has been reserved by the first node; and
   obtaining, by the first node, operational quorum when it is verified that the quorum disk is reserved by the first node.

2. The computer implemented method of claim 1, wherein the time delay is imposed when the first node determined that the external point is not successfully communicated with.

3. The computer implemented method of claim 1, wherein the time delay is based on an ability of the first node to communicate with a plurality of external points.

4. The computer implemented method of claim 3, wherein the time delay increases as a number of the plurality of external points that cannot be communicated with increases.

5. The computer implemented method of claim 1, wherein the time delay is based on at least one of an accessibility or a workload availability of the first node.

6. The computer implemented method of claim 5, wherein the time delay is increased as the accessibility or workload availability decreases.

7. The computer implemented method of claim 1, wherein the time delay is based on an ability of the first node to provide predetermined services to the client.

8. The computer implemented method of claim 1, further comprising imposing a post reserve delay after the first node obtains quorum.

9. The computer implemented method of claim 1, wherein the first node and the second node form a high availability cluster.

10. The computer implemented method of claim 1, wherein the first node and the second node form a sub-cluster of a high availability cluster.

11. The computer implemented method of claim 10, the method further comprising performing tie-breaking between a plurality of sub-clusters.

12. A system to manage tie-breaking in a multi-node cluster, the system comprising:
    a first node of the multi-node cluster configured to provide service to a client and access a quorum disk of the multi-node cluster, the first node having a memory having computer readable instructions and a processor configured to execute the computer readable instructions, the computer readable instructions comprising:

detecting, by the first node, that a private network connected to a second node of the multi-node cluster has failed;

communicating, by the first node, with an external point;

determining, by the first node, if the external point is successfully communicated with;

determining, by the first node, whether a time delay should be imposed;

waiting, by the first node, a period equal to the determined time delay, if any;

attempting, by the first node, to reserve the quorum disk;

verifying, by the first node, that the quorum disk has been reserved by the first node; and obtaining, by the first node, operational quorum when it is verified that the quorum disk is reserved by the first node.

13. The system of claim 12, wherein the time delay is imposed when the first node determined that the external point is not successfully communicated with.

14. The system claim 12, wherein the time delay is based on an ability of the first node to communicate with a plurality of external points.

15. The system claim 9, wherein the time delay is based on at least one of an accessibility or a workload availability of the first node.

16. The system claim 12, wherein the time delay is based on an ability of the first node to provide predetermined services to the client.

17. The system claim 9, wherein the first node and the second node form a high availability cluster.

18. A computer program product to manage tie-breaking in a multi-node cluster, the computer program product comprising a computer readable storage medium having program instructions embodied therewith, the program instructions executable by a processor to cause the processor to:

detect, by a first node of the multi-node cluster, that a private network connected to a second node of the multi-node cluster has failed;

communicate, by the first node, with an external point;

determine, by the first node, if the external point is successfully communicated with;

determine, by the first node, whether a time delay should be imposed;

wait, by the first node, a period equal to the determined time delay, if any;

attempt, by the first node, to reserve the quorum disk;

verify, by the first node, that the quorum disk has been reserved by the first node; and obtain quorum when it is verified that the quorum disk is reserved by the first node.

19. The computer program product of claim 18, wherein the time delay is based on at least one of (i) based on the first node determining that the external point is not successfully communicated with, (ii) based on an ability of the first node to communicate with a plurality of external points, (iii) based on an accessibility of the first node, or (iv) based on a workload availability of the first node.

20. The computer program product of claim 18, wherein the first node and the second node form a high availability cluster.

* * * * *